United States Patent
Ota et al.

(10) Patent No.: US 8,116,061 B2
(45) Date of Patent: Feb. 14, 2012

(54) SOLID ELECTROLYTIC CAPACITOR HAVING CURRENT BREAKING FUNCTION

(75) Inventors: Taeko Ota, Takatsuki (JP); Masayuki Fujita, Kyoto (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 498 days.

(21) Appl. No.: 12/337,951

(22) Filed: Dec. 18, 2008

(65) Prior Publication Data
US 2009/0159323 A1    Jun. 25, 2009

(30) Foreign Application Priority Data

Dec. 21, 2007   (JP) .................................. 2007-329588
Nov. 17, 2008   (JP) .................................. 2008-293504

(51) Int. Cl.
*H01G 2/14* (2006.01)
*H01G 9/02* (2006.01)
*H01G 2/00* (2006.01)

(52) U.S. Cl. .................... 361/274.1; 361/525; 361/275.1

(58) Field of Classification Search .............. 361/525, 361/526, 523, 272, 274.1, 275.1; 252/62.2; 29/25.03
See application file for complete search history.

(56) References Cited

U.S. PATENT DOCUMENTS

| 4,525,507 A * | 6/1985 | Chaker et al. ................. 524/104 |
| 2003/0137799 A1* | 7/2003 | Igaki et al. ..................... 361/523 |
| 2004/0034151 A1* | 2/2004 | Kaschak et al. ............. 524/495 |
| 2008/0070108 A1* | 3/2008 | Lin et al. ........................ 429/162 |

FOREIGN PATENT DOCUMENTS

JP    2001-176374 A    6/2001

* cited by examiner

*Primary Examiner* — Eric Thomas
*Assistant Examiner* — Arun Ramaswamy
(74) *Attorney, Agent, or Firm* — Marvin A. Motsenbocker; Mots Law, PLLC

(57) ABSTRACT

A solid electrolytic capacitor that can be miniaturized while maintaining the function for breaking current when excessive short-circuit current flows to a capacitor element. The solid electrolytic capacitor includes an anode body, a dielectric layer formed on the anode body, a conductive polymer layer formed on the dielectric layer, and a cathode layer formed on the conductive polymer layer. The conductive polymer layer contains thermally expandable graphite.

15 Claims, 5 Drawing Sheets

Fig. 6

| Solid Electrolytic Capacitor | Expansion Initiation Temperature (°C) | Capacitance[1] | Number of Open Circuits[2] (Quantity) | Number of Fumed Elements[2] (Quantity) | Number of Ignited Elements[2] (Quantity) | Element Occupation Rate (%) |
|---|---|---|---|---|---|---|
| Example 1 | A1 | 250 | 100 | 100 | 0 | 0 | 35 |
| Example 2 | A2 | 300 | 100 | 100 | 0 | 0 | 35 |
| Example 3 | A3 | 350 | 100 | 100 | 0 | 0 | 35 |
| Example 4 | A4 | 400 | 100 | 100 | 0 | 0 | 35 |
| Example 5 | A5 | 450 | 100 | 100 | 5 | 0 | 35 |
| Comparative Example 1 | X | — | 100 | 0 | 100 | 100 | 35 |
| Comparative Example 2 | Y | — | 100 | 87 | 13 | 9 | 10 |

1) Capacitance of comparative example 1 (solid electrolytic capacitor X) set as 100 and used as a standard
2) 100 samples

Fig. 7

| Solid Electrolytic Capacitor | Expansion Coefficient (cm³/g) | Content (% by Weight) | Capacitance[1] | Number of Open Circuits[2] (Quantity) |
|---|---|---|---|---|
| Example 6 | B1 | 2 | 40 | 100 | 96 |
| Example 7 | B2 | 2.5 | 40 | 100 | 100 |
| Example 8 | B3 | 3 | 40 | 100 | 100 |
| Example 2 | A2 | 10 | 40 | 100 | 100 |
| Example 9 | B4 | 30 | 40 | 100 | 100 |
| Comparative Example 1 | X | — | — | 100 | 0 |
| Comparative Example 2 | Y | — | — | 100 | 87 |

1) Capacitance of comparative example 1 (solid electrolytic capacitor X) set as 100 and used as a standard
2) 100 samples

Fig.8

| | Solid Electrolytic Capacitor | Expansion Coefficient (cm³/g) | Content (% by Weight) | Capacitance[1] | Number of Open Circuits[2] (Quantity) |
|---|---|---|---|---|---|
| Example 10 | C1 | 20 | 2.5 | 100 | 94 |
| Example 11 | C2 | 20 | 5 | 100 | 100 |
| Example 12 | C3 | 20 | 10 | 100 | 100 |
| Example 13 | C4 | 20 | 40 | 100 | 100 |
| Example 14 | C5 | 20 | 45 | 95 | 100 |
| Comparative Example 1 | X | — | — | 100 | 0 |
| Comparative Example 2 | Y | — | — | 100 | 87 |

1) Capacitance of comparative example 1 (solid electrolytic capacitor X) set as 100 and used as a standard
2) 100 samples

Fig.9

| | Solid Electrolytic Capacitor | Expansion Coefficient (cm³/g) | Content (% by Weight) | Performance Index[1] | Number of Open Circuits[2] (Quantity) |
|---|---|---|---|---|---|
| Example 15 | D1 | 2 | 20 | 40 | 93 |
| Example 16 | D2 | 2.5 | 20 | 50 | 98 |
| Example 10 | C1 | 20 | 2.5 | 50 | 94 |
| Example 6 | B1 | 2 | 40 | 80 | 96 |
| Example 7 | B2 | 2.5 | 40 | 100 | 100 |
| Example 17 | D3 | 5 | 20 | 100 | 100 |
| Example 11 | C2 | 20 | 5 | 100 | 100 |
| Example 8 | B3 | 3 | 40 | 120 | 100 |
| Example 18 | D4 | 10 | 20 | 200 | 100 |
| Example 12 | C3 | 20 | 10 | 200 | 100 |
| Example 2 | A2 | 10 | 40 | 400 | 100 |
| Example 19 | D5 | 20 | 20 | 400 | 100 |
| Example 13 | C4 | 20 | 40 | 800 | 100 |
| Example 20 | D6 | 50 | 20 | 1000 | 100 |
| Example 9 | B4 | 30 | 40 | 1200 | 100 |
| Comparative Example 1 | X | — | — | — | 0 |
| Comparative Example 2 | Y | — | — | — | 87 |

1) Performance index = expansion coefficient × content
2) 100 samples

SOLID ELECTROLYTIC CAPACITOR HAVING CURRENT BREAKING FUNCTION

CROSS-REFERENCE TO RELATED APPLICATIONS

This application is based upon and claims the benefit of priority from the prior Japanese Patent Applications No. 2007-329588, filed on Dec. 21, 2007, and No. 2008-293504, filed on Nov. 17, 2008, the entire contents of which are incorporated herein by reference.

BACKGROUND OF THE INVENTION

The present invention relates to electronic components, solid electrolytic capacitors, and circuit substrates mounted with the same, more specifically, to an electronic component having a current breaking function, a solid electrolytic capacitor having a current breaking function, and a circuit substrate including such a solid electrolytic capacitor.

In recent years, as progress is being made in miniaturization of electronic devices such as portable information terminals, miniaturization and safety is required for the various types of electronic components forming the circuit of an electronic device.

Among such electronic components, in various types of portable information terminals, such as a personal computers and mobile phones, various types of video information devices such as digital cameras, and other types of electronic devices, solid electrolytic capacitors are particularly often incorporated in the power supply circuit of a CPU and its peripheral circuits. A solid electrolytic capacitor is advantageous in that it has a low failure rate.

Japanese Laid-Open Patent Publication No. 2001-176374 describes a so-called fuse-incorporated solid electrolytic capacitor in which a fuse is connected between a capacitor element and a terminal. The fuse is sealed in a package resin.

In the fuse-incorporated solid electrolytic capacitor described in the above publication, the fuse (i.e., wire-like sintered fuse that melts at a temperature of approximately 300° C.) is installed between the capacitor element and the terminal. The fuse opens the electric circuit and breaks the flow of current when excessive short-circuit current flows to the capacitor element.

However, when using the fuse-incorporated solid electrolytic capacitor described in the above publication, the structure becomes complicated, and the volume efficiency of the internal elements is decreased by an amount corresponding to the space occupied by the fuse. Thus, there is a certain limit when reducing the solid electrolytic capacitor in size while increasing the capability of the solid electrolytic capacitor. Such a limit to miniaturization resulting from the addition of the fuse applies not only to solid electrolytic capacitors but also to various types of electronic components used in electronic devices.

SUMMARY OF THE INVENTION

The present invention provides a solid electrolytic capacitor that can be miniaturized while maintaining the current breaking function when excessive short-circuit current flows to the capacitor element. The present invention also provides a circuit substrate including such a solid electrolytic capacitor.

The present invention is not limited to a solid capacitor element, and also provides an electronic component having a function that takes the place of a conventional fuse, that is, a current breaking function.

One aspect of the present invention is a solid electrolytic capacitor including an anode body, a dielectric layer formed on the anode body, a conductive polymer layer formed on the dielectric layer, and a cathode layer formed on the conductive polymer layer. The conductive polymer layer contains thermally expandable graphite.

Another aspect of the present invention is a circuit substrate including a solid electrolytic capacitor connected to the circuit substrate with a solder member. The solid electrolytic capacitor includes an anode body, a dielectric layer formed on the anode body, a conductive polymer layer formed on the dielectric layer, and a cathode layer formed on the conductive polymer layer. The conductive polymer layer contains thermally expandable graphite, and the thermally expandable graphite starts to expand at a temperature that is higher than the melting temperature of the solder member.

A further aspect of the present invention is an electronic component including at least a polymer layer containing thermally expandable graphite.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a table showing evaluation results of solid electrolytic capacitors in examples 1 to 5 and comparative examples 1 and 2;

FIG. 7 is a table showing evaluation results of the solid electrolytic capacitors in examples 2 and 6 to 9 and comparative examples 1 and 2;

FIG. 8 is a table showing evaluation results of the solid electrolytic capacitors in examples 10 to 14 and comparative examples 1 and 2; and FIG. 9 is a table showing evaluation results of the solid electrolytic capacitors in examples 2, 6 to 13, and 15 to 20, and comparative examples 1 and 2.

DETAILED DESCRIPTION OF THE PREFERRED EMBODIMENTS

Figure 1A:
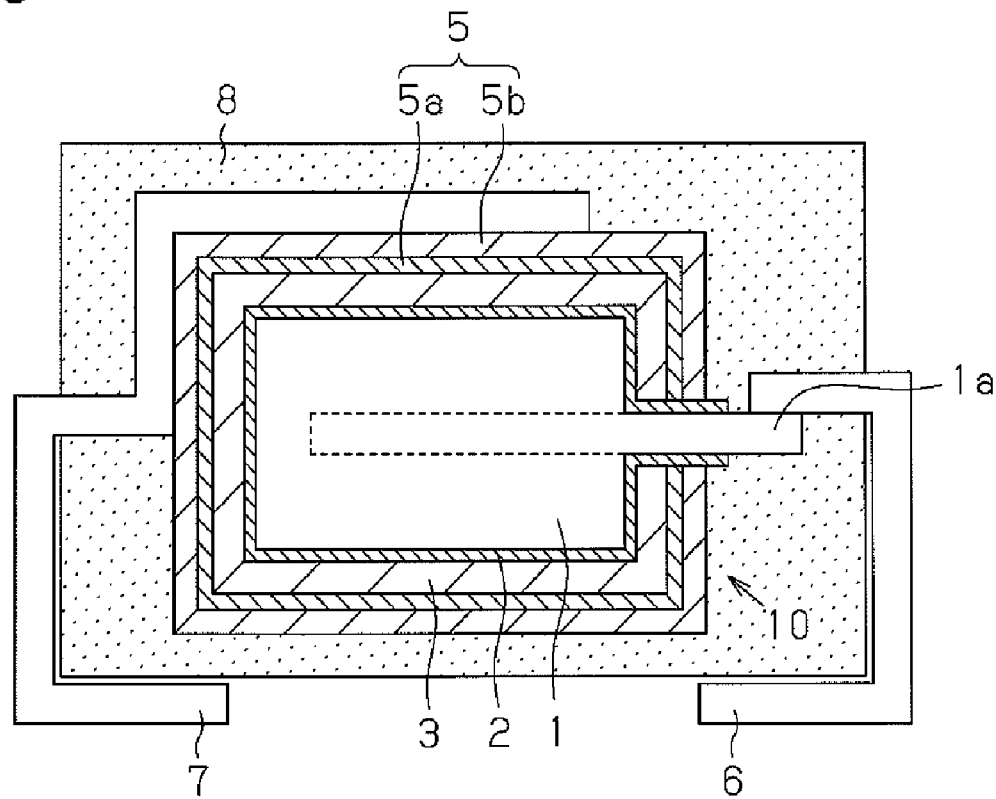
FIG. 1A is a schematic cross-sectional view showing the structure of a solid electrolytic capacitor according to a preferred embodiment of the present invention.

In the drawings, like numerals are used for like elements throughout.

A solid electrolytic capacitor according to a preferred embodiment of the present invention will now be discussed with reference to the drawings. The present invention is not limited in any manner by the preferred embodiment.

Figure 1B:
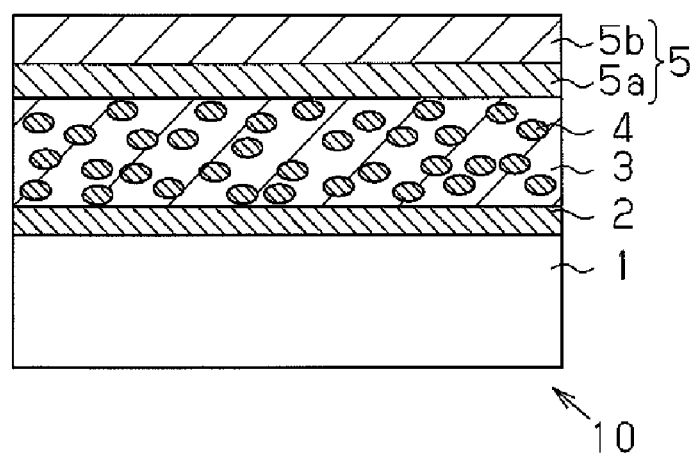
FIG. 1B is a partially enlarged view showing the vicinity of a conductive polymer layer in the solid electrolytic capacitor of FIG. 1A.
Figure 2:
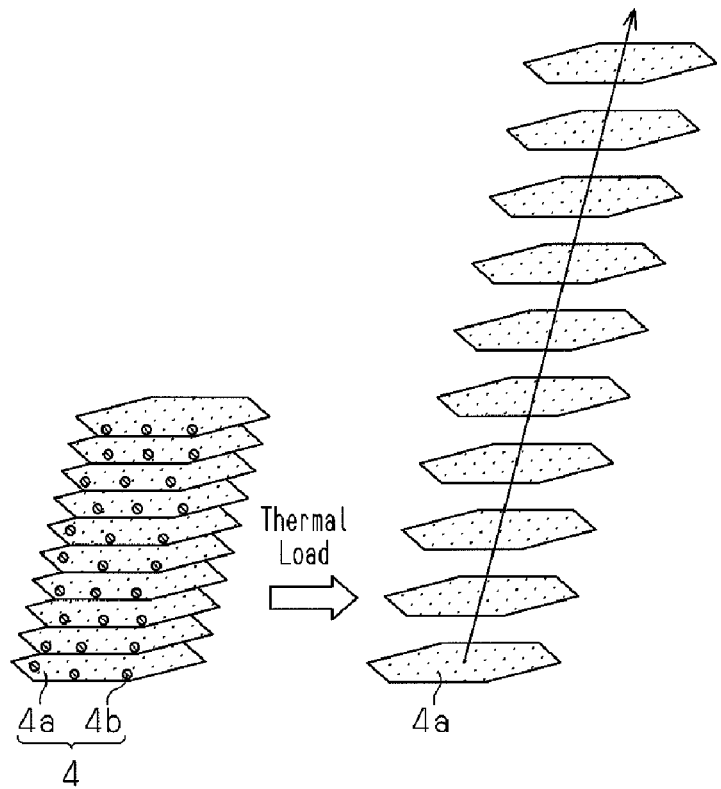
FIG. 2 is a schematic diagram showing states before and after thermally expandable graphite is expanded by thermal load.

FIG. 1 is a schematic cross-sectional view showing the structure of the solid electrolytic capacitor in the preferred embodiment. FIG. 1A is a schematic cross-sectional view of the entire solid electrolytic capacitor, and FIG. 1B is a partially enlarged view showing the vicinity of a conductive polymer layer in the solid electrolytic capacitor. FIG. 2 is a schematic view showing states before and after thermally expandable graphite is expanded by thermal load.

As shown in FIG. 1A, the solid electrolytic capacitor in the preferred embodiment has a capacitor element 10 including an anode body 1 out of which an anode lead 1a extends, a dielectric layer 2 formed on a surface of the anode body 1, a conductive polymer layer 3 formed on the dielectric layer 2, and a cathode layer 5 formed on the conductive polymer layer 3. As shown in FIG. 1B, the conductive polymer layer 3 contains thermally expandable graphite grains 4, which are expanded by thermal load. The thermally expandable graphite grains 4 are contained substantially throughout the conductive polymer layer 3. More specifically, the conductive polymer layer 3 contains the thermally expandable graphite grains 4, which are in a pre-expansion state. As shown in FIG. 1A, a plate-shaped cathode terminal 7 is bonded to the cathode layer 5 of the capacitor element 10 by a conductive adhesive (not shown). A plate-shaped anode terminal 6 is bonded to the anode lead 1a. A mold package 8, which is formed from epoxy resin or the like, is molded in a state in which the anode terminal 6 and the cathode terminal 7 are partially extended out of the mold package 8 as shown in FIG. 1A.

The structure of a specific solid electrolytic capacitor will now be described.

The anode body 1 is a porous sinter formed from a valve metal, and the anode lead 1a is a rod-shaped lead formed from the same valve metal. The anode lead 1a is embedded in the anode body 1 in a state partially projecting out of the anode body 1. The valve metal of the anode lead 1a and the anode body 1 is a metal material enabling the formation of an insulative oxide film and is one of metals such as tantalum (Ta), niobium (Nb), aluminum (Al), titanium (Ti), or the like. An alloy of these valve metals may also be used.

The dielectric layer 2 is a dielectric formed from oxides of the valve metal and has a predetermined thickness on the surface of the anode body 1. If the valve metal includes tantalum metal, the dielectric layer 2 is a tantalum oxide.

The conductive polymer layer 3 functions as an electrolyte layer and is arranged on the surface of the dielectric layer 2. The material of the conductive polymer layer 3 is not particularly limited as long as it is a conductive polymer material. Materials such as polyethylenedioxythiophene, polypyrrole, polythiophene, and polyaniline, which have superior conductivity, and derivatives of these materials may be used for the conductive polymer layer 3. The thermally expandable graphite grains 4 are contained substantially throughout the conductive polymer layer 3. As shown in FIG. 2, the thermally expandable graphite grains 4 are each formed in layers, with each layer mainly containing crystalline planes 4a of the graphite and interlayer fillings 4b. Thermal load (heating to a high temperature) decomposes the interlayer fillings 4b and causes expansion. This generates gas pressure that expands the crystalline planes 4a of the graphite in the direction of the arrow (i.e., lamination direction). The expanded crystalline planes 4a form a structure in which a void (space) is provided between crystalline planes 4a. As a result, the thermal load produces an electrical gap in the conductive polymer layer 3 with the thermally expandable graphite grains 4.

The production of the electrical gap in the conductive polymer layer 3, which contains the thermally expandable graphite grains 4, may be controlled by adjusting the expansion coefficient (the volume per gram when heating the graphite for ten seconds at a temperature of 1000° C.: $cm^3/g$), expansion initiation temperature (the temperature when expanded to 1.1 times the original volume or greater: ° C.); the content (weight of the thermally expandable graphite with respect to the total weight of the conductive polymer layer: % by weight), and the like of the thermally expandable graphite grains.

As shown in FIGS. 1A and 1B, the cathode layer 5 is a laminated layer of a conductive carbon layer 5a, which preferably contains carbon particles, and a silver paste layer 5b, preferably containing silver particles. The cathode layer 5 is arranged on the conductive polymer layer 3.

The capacitor element 10 is formed by the anode body 1 out of which the anode lead 1a extends, the dielectric layer 2, the conductive polymer layer 3, and the cathode layer 5.

The anode terminal 6 and the cathode terminal 7 are plate-shaped and preferably formed from a conductive material, such as copper (Cu) or nickel (Ni). Further, the anode terminal 6 and the cathode terminal 7 each function as an external lead terminal of the solid electrolytic capacitor. The anode terminal 6 is spot-welded and bonded to the anode lead 1a. The cathode terminal 7 is bonded to the cathode layer 5 by the conductive adhesive (not shown).

The mold package 8, which is formed from epoxy resin or the like, is molded in a state in which the anode terminal 6 and the cathode terminal 7 are partially extended out of the mold package 8 in opposite directions. End portions of the anode terminal 6 and the cathode terminal 7, which are exposed from the mold package 8, are bent along the side surface and lower surface of the mold package 8 and function as terminals when the solid electrolytic capacitor is connected (soldered) to a mounting substrate.

The anode body 1 serves as the "anode body" of the present invention. The dielectric layer 2 serves as the "dielectric layer" of the present invention. The conductive polymer layer 3 serves as the "conductive polymer layer" of the present invention. The thermally expandable graphite grains 4 serves as the "thermally expandable graphite" of the present invention. The cathode layer 5 serves as the "cathode layer" of the present invention.

[Manufacturing Process]

A process for manufacturing the solid electrolytic capacitor of the preferred embodiment shown in FIG. 1 will now be discussed.

Step 1: A green body of a valve metal, which is molded so as to embed part of the anode lead 1a, is sintered in a vacuum environment to form the anode body 1, which is a porous sinter, around the anode lead 1a. The particles of the valve metal are fused to one another.

Step 2: The anode body 1 undergoes anodization in a phosphoric acid aqueous solution to form the dielectric layer 2, which is an oxide of the valve metal, with a predetermined thickness so as to enclose the anode body 1.

Step 3: Chemical polymerization is performed to form the conductive polymer layer 3 on the surface of the dielectric layer 2. Specifically, the conductive polymer layer 3 is formed by performing oxidative polymerization on a monomer with an oxidant using a chemical polymerization liquid in which the monomer and the oxidant are dissolved. In the preferred embodiment, oxidative polymerization is performed by mixing the thermally expandable graphite grains 4 in a pre-thermal-expansion state in a chemical polymerization liquid so as to contain the thermally expandable graphite grains 4 at a predetermined content in the conductive polymer layer 3. In this case, the thermally expandable graphite grains 4 are added substantially throughout the conductive polymer layer 3, which is formed on the surface of the dielectric layer 2.

The thermally expandable graphite grains 4 are formed by mixing a solid neutralizer to an acid-treated graphite, which is obtained by placing graphite into a mixture of sulfuric acid and oxidant and causing a reaction. Alternatively, the thermally expandable graphite grains 4 may be formed by processing graphite in a mixture of sulfuric acid and oxidant, washing the graphite with an alkaline aqueous solution or water, and then mixing a solid neutralizer with the graphite. The expansion performance (expansion coefficient, expansion initiation temperature, and the like) of the thermally expandable graphite grains 4 may be easily controlled by adjusting the interlayer compound (interlayer fillings 4b) used for the graphite (crystalline planes 4a of the graphite) in the above processes.

Step 4: A conductive carbon paste containing carbon particles is applied to and dried on the conductive polymer layer 3 to form the conductive carbon layer 5a. A silver paste is applied to and dried on the conductive carbon layer 5a to form the silver paste layer 5b. This forms the cathode layer 5, which is a laminated film of the conductive carbon layer 5a and the silver paste layer 5b, on the conductive polymer layer 3.

By performing the above-described steps 1 to 4, the capacitor element 10 is manufactured.

Step 5: After applying conductive adhesive (not shown) to the plate-shaped cathode terminal 7, the conductive adhesive (not shown) is dried between the cathode layer 5 and the cathode terminal 7 so as to bond the cathode layer 5 and the cathode terminal 7 with the conductive adhesive. The plate-shaped anode terminal 6 is spot-welded and bonded to the anode lead 1a.

Step 6: A transfer process is performed to mold the mold package 8 around the capacitor element 10. In this case, the mold package 8 is molded so as to accommodate the anode lead 1a, the anode body 1, the dielectric layer 2, the conductive polymer layer 3, and the cathode layer 5 in a state in which the end portions of the anode terminal 6 and the cathode terminal 7 extended out of the mold package 8 in opposite directions. The resin for molding the mold package 8 is preferably a resin having small water absorption (e.g., epoxy resin). Such a resin functions to prevent moisture from moving into and out of the mold package 8 or prevent cracking and stripping during solder reflow (heating treatment).

Step 7: The distal portions of the anode terminal 6 and the cathode terminal 7 exposed from the mold package 8 are bent downward and arranged along the side surface and the lower surface of the mold package 8. The distal portions of the terminals function as terminals of the solid electrolytic capacitor and are used to electrically connect the solid electrolytic capacitor to a mounting substrate with a solder member.

Step 8: Finally, an aging process is performed by applying a predetermined voltage to the two terminals of the solid electrolytic capacitor. This stabilizes the properties of the solid electrolytic capacitor.

By performing the above steps, the solid electrolytic capacitor in the preferred embodiment is manufactured.

Experimental Example

First, as a preliminary experiment, an evaluation was conducted on the content of the thermally expandable graphite contained in the conductive polymer layer formed through chemical polymerization.

<Preliminary Experiment>

First, 10% by weight of pyrrole serving as polymerization monomer, and 16% by weight of paratoluenesulfonic iron (III) serving as a dopant-oxidant were dissolved in a mixed solvent in which ethanol and water were mixed at 5:1 to prepare a chemical polymerization liquid. Then, 20% by weight of a powder of thermally expandable graphite (expansion initiation temperature of 250° C., expansion coefficient of 10 cm$^3$/g) in the form of grains (center grain diameter: approximately 10 μm) was uniformly mixed in the chemical polymerization liquid. Furthermore, a fixed amount (0.1 g) of the liquid mixture was applied to a glass substrate and left in the atmosphere for two hours to advance the polymerization reaction, which forms the conductive polymer film (thickness: approximately 100 μm) on the glass substrate. The glass substrate before and after the film formation was accurately weighed to obtain the weight of the formed conductive polymer film which was 0.05 g. The mixed thermally expandable graphite does not contribute to polymerization reaction. Thus, the weight of thermally expandable graphite does not change before and after the formation of the conductive polymer film. The content of the thermally expandable graphite in the formed conductive polymer film was calculated as 40% by weight (0.1 g×20% by weight/0.05 g). Commercially available thermally expandable graphite (TEG) manufactured by Air Water Inc. was used as the above-described thermally expandable graphite.

In the examples and comparative examples described below, the solid electrolytic capacitor was fabricated through the above-described steps, and the properties of each solid electrolytic capacitor were evaluated. In each example, the content of the thermally expandable graphite contained in the conductive polymer layer was controlled in view of the results of the preliminary experiment.

<Experiment 1>

The influence of the expansion initiation temperature of the thermally expandable graphite grains 4 contained in the conductive polymer layer 3 was evaluated.

Example 1

In example 1, a solid electrolytic capacitor A1 was fabricated through steps corresponding to each step (step 1 to step 8) in the manufacturing process of the above-described embodiment.

Step 1A: A green body was molded so as to embed part of the anode lead 1a using tantalum metal powder having an average particle diameter of approximately 2 μm. The green body was then sintered in a vacuum environment. This formed the anode body 1, which is a tantalum porous sinter. In this state, tantalum metal particles were fused to one another.

Step 2A: Anodization was performed on the sintered anode body 1 for ten hours at a constant voltage of approximately 8 V in a phosphoric acid aqueous solution of approximately 0.1% by weight held at a temperature of approximately 60° C. This formed the dielectric layer 2, which is a tantalum oxide, so as to cover the anode body 1.

Step 3A: Then, 10% by weight of pyrrole serving as polymerization monomer and 16% by weight of paratoluenesulfonic iron (III) serving as dopant-oxidant were dissolved in a mixed solvent in which ethanol and water were mixed at 5:1 to prepare a chemical polymerization liquid. Further, 20% by weight of thermally expandable graphite powder (granular powder/center grain diameter: approximately 10 μm) having a predetermined expansion performance (expansion initiation temperature of 250° C., expansion coefficient of 10 cm$^3$/g) was uniformly mixed in the chemical polymerization liquid to prepare a liquid mixture. The anode body 1 formed with the dielectric layer 2 was immersed in the liquid mixture and left in the atmosphere for two hours to advance the polymerization reaction. This formed the conductive polymer layer 3 (thickness: approximately 100 μm) from polypyrrole on the dielectric layer 2. In this state, the thermally expandable graphite grains 4 having the predetermined expansion performance were added in the conductive polymer layer 3 at a content of 40% by weight. The thermally expandable graphite grains 4 were uniformly added substantially throughout the conductive polymer layer 3, which was formed on the surface of the dielectric layer 2.

Step 4A: A conductive carbon paste was applied to and dried on the conductive polymer layer 3 to form the conductive carbon layer 5a, which contains carbon particles. A silver paste was applied to and dried on the conductive carbon layer 5a to form the silver paste layer 5b, which contains silver particles. This formed the cathode layer 5 of laminated film including the conductive carbon layer 5a and the silver paste layer 5b on the conductive polymer layer 3.

The solid electrolytic capacitor A1 in example 1 was then manufactured through the above-described steps 5 to 8.

Examples 2 to 5

In examples 2 to 5, solid electrolytic capacitors A2 to A5 were fabricated in a manner similar to example 1 other than that the thermally expandable graphite grains 4 (expansion coefficient 10 cm$^3$/g) in which expansion initiation temperatures of 300° C., 350° C., 400° C., and 450° C. were used, and that the conductive polymer layers 3 containing such thermally expandable graphite at 40% by weight were respectively formed in step 3A.

Comparative Example 1

In comparative example 1, a solid electrolytic capacitor X was fabricated in a manner similar to example 1 except in that the conductive polymer layer 3 was formed using chemical polymerization liquid that was free from the thermally expandable graphite grains 4 in step 3A. The comparative example 1 (solid electrolytic capacitor X) is an example of a typical solid electrolytic capacitor (solid electrolytic capacitor that does not have the fuse function).

Comparative Example 2

Figure 3:
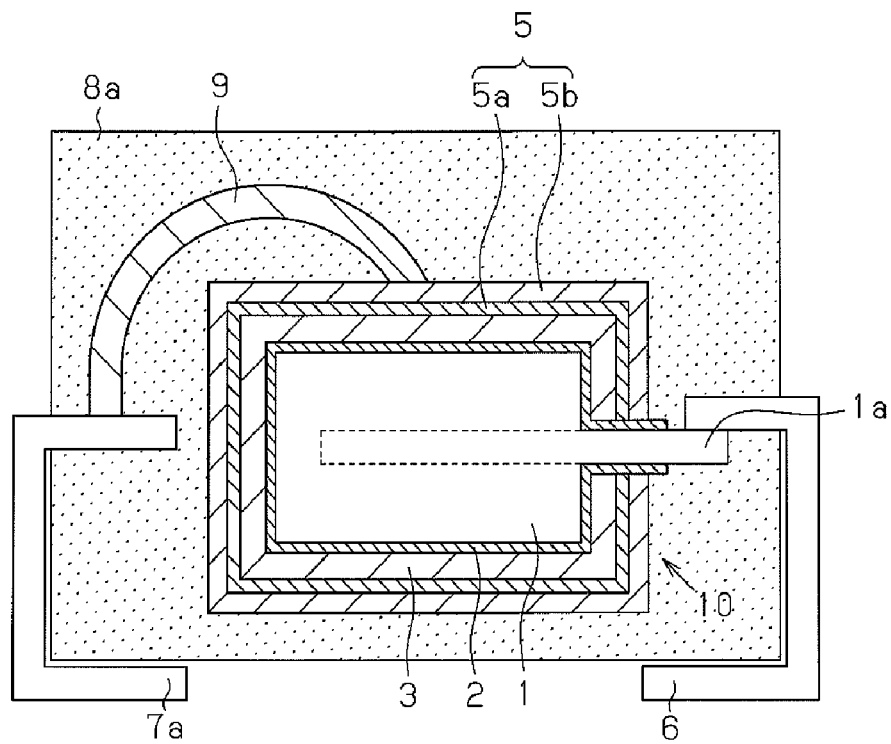
FIG. 3 is a schematic cross-sectional view showing the structure of a fuse-incorporated solid electrolytic capacitor.

FIG. 3 is a schematic cross-sectional view showing the structure of a solid electrolytic capacitor in comparative example 2. As shown in FIG. 3, in comparative example 2, a solid electrolytic capacitor Y was fabricated in a manner similar to comparative example 1 except in that the plate-shaped cathode terminal 7a and the cathode layer 5 (silver paste layer 5b) were connected by a gold wire 9 (wire diameter of 50 μm) functioning as a fuse. Comparative example 2 (solid electrolytic capacitor Y) is an example of a typical fuse-incorporated solid electrolytic capacitor of the related art.

[Evaluation]

First, the element occupation rate of each solid electrolytic capacitor (occupation rate of the volume of the capacitor element with respect to the volume of the solid electrolytic capacitor) was evaluated. The volume of the solid electrolytic capacitor and the volume of the capacitor element incorporated in the solid electrolytic capacitor were calculated from the outer dimensions of the solid electrolytic capacitor and capacitor element. In example 1 (solid electrolytic capacitor A1), the volume of the solid electrolytic capacitor was 38.8 mm$^3$, and the volume of the capacitor element was 13.5 mm$^3$. In comparative example 2 (solid electrolytic capacitor Y), the volume of the solid electrolytic capacitor was 125.6 mm$^3$, and the volume of the capacitor element was 13.1 mm$^3$. The volume of each of the other solid electrolytic capacitors and capacitor elements was calculated in the same manner. FIG. 6 shows the result of the element occupation rate calculated from such volume values.

The capacitance was then evaluated for each solid electrolytic capacitor. The capacitance was measured at a frequency of 120 Hz with an LCR meter after connecting each solid electrolytic capacitor to a printed substrate with a solder member. FIG. 6 shows the evaluation results of the capacitance in each solid electrolytic capacitor. Each of the measurement values of the capacitance in the table is the average value for 100 solid electrolytic capacitor samples and standardized as 100, which is based on the measurement result of the capacitance in comparative example 1 (solid electrolytic capacitor X).

For each solid electrolytic capacitor, a test for checking the fuse function and test for checking combustion were performed. In the fuse function test, an overvoltage of 16 V, which is twice the anodization voltage in step 2A, was applied to the solid electrolytic capacitor on the printed substrate to short-circuit the capacitor element. Then, in a state in which an overcurrent of 5 A was applied, the electric circuit was observed to check whether or not it opens. In the combustion test, under the same conditions, the capacitor element was checked for fumes or ignition. FIG. 6 shows the evaluation results of the fuse function test and the combustion verification test in each solid electrolytic capacitor. In the fuse function test, 100 solid electrolytic capacitor samples were used and the number of electric circuits that became open (number of open circuits) were counted. In the combustion verification test, the same 100 samples were used and the number of capacitor elements that fumed (number of fumed elements) and the number of capacitor elements that ignited (number of ignited elements) were counted.

In the capacitance evaluation and each test (fuse function test and combustion test), a typical Pb-free solder material was used as the solder member. When connecting the solid electrolytic capacitor to the printed substrate with the solder member, the solder member was formed so as not to overheat (specifically, heated to 250° C. or higher) the capacitor element using a soldering iron.

As shown in FIG. 6, in comparative example 2 (solid electrolytic capacitor Y), which is of a fuse-incorporated type of the related art, the fuse function works and the number of open circuits are drastically increased compared to comparative example 1 (solid electrolytic capacitor X), which does not have a fuse. However, in comparative example 2, there were some samples (13) in which the fuse function did not work and thereby fumed or ignited the capacitor element. In each of examples 1 to 5 (solid electrolytic capacitors A1 to A5), which include the conductive polymer layer 3 containing the thermally expandable graphite grains 4, the number of open circuits is 100, and the fuse function always works to break the current when overcurrent flows. That is, in examples 1 to 5, the conductive polymer layer 3 contains the thermally expandable graphite grains 4. Thus, the thermally expandable graphite grains 4 expand when the capacitor element 10 is heated by overcurrent, and an electrical gap is produced in the conductive polymer layer 3. As a result, the current flowing to the solid electrolytic capacitor (capacitor element 10) can be broken.

Furthermore, examples 1 to 5 (solid electrolytic capacitors A1 to A5) have a higher element occupation rate than comparative example 2 (solid electrolytic capacitor Y), which is of the fuse-incorporated type, and the volume efficiency of the capacitor element is improved. Moreover, examples 1 to 5 (solid electrolytic capacitors A1 to A5) maintain the same element occupation rate as comparative example 1 (solid electrolytic capacitor X), which does not have the fuse of the related art.

Examples 1 to 5 (solid electrolytic capacitors A1 to A5) have the same capacitance as comparative example 1 (solid electrolytic capacitor X) and comparative example 2 (solid electrolytic capacitor Y). The thermally expandable graphite grains 4 (content: 40% by weight) contained in the conductive polymer layer 3 barely influence the capacitance, as will be discussed in detail later.

As described above, in order for the solid electrolytic capacitor to implement the fuse function without using the fuse of the related art, it is effective to contain the thermally expandable graphite grains 4 in the conductive polymer layer 3 as in the present invention.

In example 5 (solid electrolytic capacitor A5), the number of open circuits (fuse function test) showed a satisfactory result. However, fumes were found in some (five) of the evaluated samples. It is assumed that this is because the capacitor element 10 fumed before the thermally expandable graphite grains 4 started to expand and break the current since the thermal initiation temperature of the thermally expandable graphite grains 4 used in example 5 was 450° C. In the case of comparative example 1 (solid electrolytic capacitor X) that does not include the fuse of the related art, in another experiment (heating test), fumes were found at a temperature exceeding 400° C. and ignitions occurred thereafter.

A case in which the procedures for connecting the solid electrolytic capacitor to the printed substrate with the solder member were changed will now be discussed. The capacitance evaluation and tests (fuse function test combustion test) were conducted on each solid electrolytic capacitor in correspondence with FIG. 6. Specifically, the solder member was formed through a solder reflow process (soldering temperature of 260° C. or higher, heating process time of 10 seconds), which is employed in a fabrication process for mass production. The soldering temperature in the solder reflow process is at least the temperature at which the solder member melts.

In example 1 (solid electrolytic capacitor A1), capacitance was measured in 90% of the samples. However, in each solid electrolytic capacitor) of the remaining examples 2 to 5, comparative example 1, and comparative example 2 (solid electrolytic capacitors A2 to A5, X, and Y, the same evaluation results as FIG. 6 were obtained. It is assumed that this is because the thermally expandable graphite grains 4 started to expand during a reflow process in some capacitors since the expansion initiation temperature of the thermally expandable graphite grains 4 used in example 1 was 250° C. and the solid electrolytic capacitor (capacitor element 10) thereby failed to function.

Therefore, it is preferred that the thermally expandable graphite grains 4e contained in the conductive polymer layer 3 have an expansion initiation temperature that is higher than the temperature at which the solder member melts (soldering temperature). It is further preferred that the expansion initiation temperature of the thermally expandable graphite grains 4 be in a range of 300° C. to 400° C. For example, if the thermally expandable graphite grains 4 expand under an environment in which the temperature is 300° C. so that current does not flow to the capacitor element 10 (between the anode terminal 6 and cathode terminal 7), the heating (excessive heat generation) of the capacitor element 10 can be prevented. Thus, the reliability (safety) of the solid electrolytic capacitor is improved to cope with an erroneous connection or a failure. An environment in which the temperature is 300° C. refers to a state in which the solid electrolytic capacitor (or its mounting substrate) is heated to a temperature of 300° C. or exposed to an atmosphere in which the temperature is 300° C.

<Experiment 2>

The influence of the expansion coefficient of the thermally expandable graphite grains 4 contained in the conductive polymer layer 3 was evaluated.

Examples 6 to 9

In examples 6 to 9, solid electrolytic capacitors B1 to B4 were fabricated in a manner similar to example 1 except in that the thermally expandable graphite grains 4 (thermal initiation temperature of 300° C.) of which expansion coefficients were 2 cm$^3$/g, 2.5 cm$^3$/g, 3 cm$^3$/g, and 30 cm$^3$/g were used and that the conductive polymer layers 3 containing 40% by weight of such thermally expandable graphite were formed in step 3A.

[Evaluation]

Electrostatic capacitance evaluation and the fuse function test were carried out for each solid electrolytic capacitor. FIG. 7 shows the evaluation result (expansion coefficient dependence) of the capacitance and the number of open circuits for each solid electrolytic capacitor. The solder reflow process described above was employed when performing soldering on the printed substrate, and the capacitance evaluation and fuse function test were conducted in a manner similar to FIG. 6. Each of the measurement values of the capacitance in the table of FIG. 7 is the average value for 100 solid electrolytic capacitor samples and standardized as 100, which is based on the measurement result of the capacitance in comparative example 1 (solid electrolytic capacitor X).

As shown in FIG. 7, in examples 2 and 6 to 9 (solid electrolytic capacitors A2 and B1 to B4) in which the thermally expandable graphite grains 4 having expansion coefficients are contained, the fuse function works properly and the number of open electric circuits is increased compared to comparative example 1 (solid electrolytic capacitor X), which does not have a fuse, or comparative example 2 (solid electrolytic capacitor Y), which is of the fuse-incorporated type. The breakage of current is more ensured during a short-circuit when the expansion coefficient of the thermally expandable graphite grains 4 is larger. It is assumed that this is because if the expansion coefficient is small, an electrical gap is not sufficiently produced in the conductive polymer layer 3 even if thermal load expands the thermally expandable graphite grains 4, and the electric circuit thereby cannot open and break the current.

Examples 2 and 6 to 9 (solid electrolytic capacitors A2, B1 to B4) have a capacitance that is the same as comparative example 1 (solid electrolytic capacitor X) and comparative example 2 (solid electrolytic capacitor Y).

Therefore, when containing the thermally expandable graphite grains 4 in the conductive polymer layer 3, the expansion coefficient of the thermally expandable graphite grains 4 is preferably 2.5 cm$^3$/g or greater.

<Experiment 3>

The influence of the content of the thermally expandable graphite grains 4 contained in the conductive polymer layer 3 was evaluated.

Examples 10 to 14

In examples 10 to 14, solid electrolytic capacitors C1 to C5 were fabricated in a manner similar to example 1 except in that the thermally expandable graphite grains 4 had an expansion initiation temperature of 300° C. and an expansion coefficient of 20 cm$^3$/g and the content of the thermally expandable graphite grains 4 in the conductive polymer layers 3 were 2.5% by weight, 5% by weight, 10% by weight, 40% by weight, and 45% in step 3A.

[Evaluation]

Electrostatic capacitance evaluation and the fuse function test were carried out for each solid electrolytic capacitor. FIG. 8 shows the evaluation results (content dependence) of the capacitance and the number of open circuits for each solid electrolytic capacitor. The solder reflow process described above was employed to perform soldering on the printed substrate, and the evaluation of the capacitance and the fuse function test were carried out in a manner similar to FIG. 6. Each of the measurement values of the capacitance in the table of FIG. 8 is the average value for 100 solid electrolytic capacitor samples and standardized as 100, which is based on the measurement result of the capacitance in comparative example 1 (solid electrolytic capacitor X).

As shown in FIG. 8, in examples 10 to 14 (solid electrolytic capacitors C1 to C5), which have different contents for the thermally expandable graphite grains 4, the fuse function works properly and the number of open electric circuits is increased compared to comparative example 1 (solid electrolytic capacitor X), which does not have a fuse, or comparative example 2 (solid electrolytic capacitor Y), which is of the fuse-incorporated type. Breakage of current during a short-circuit is more ensured when the content of the thermally expandable graphite grains 4 is greater. It is assumed that this is because an electrical gap is not sufficiently produced in the conductive polymer layer 3 even when thermal load expands the thermally expandable graphite grains 4 if the content is small, and the electric circuit thereby cannot open and break the current.

In example 14 (solid electrolytic capacitor C5), the number of open circuits (fuse function test) showed a satisfactory result. However, there was a decrease in the capacitance. It is assumed that this is because the area of contact between the dielectric layer 2 and the conductive polymer layer 3 that increases or decreases the capacitance was reduced since the content of the thermally expandable graphite grains 4 in example 14 was 45% by weight. This increases the area of contact between the thermally expandable graphite grains 4 and the dielectric layer 2 compared to the other examples.

Therefore, it is preferred that content of the thermally expandable graphite grains 4 in the conductive polymer layer 3 be in the range of 5% by weight to 40% by weight.

<Experiment 4>

The influence of a performance index of the thermally expandable graphite grains 4 contained in the conductive polymer layer 3 was evaluated. The performance index is a value calculated by multiplying the expansion coefficient (cm$^3$/g) and content (% by weight) of the thermally expandable graphite grains 4.

Examples 15 to 20

In examples 15 to 20, solid electrolytic capacitors D1 to D6 were fabricated in a manner similar to example 1 except in that the thermally expandable graphite grains 4 had an expansion coefficient of 2 cm$^3$/g, 2.5 cm$^3$/g, 5 cm$^3$/g, 10 cm$^3$/g, 20 cm$^3$/g, and 50 cm$^3$/g (thermal initiation temperature of 300° C.) and that the content of the thermally expandable graphite in the conductive polymer layers 3 was 20% in step 3A. The performance index of the thermally expandable graphite grains 4 was 40, 50, 100, 200, 400, and 1000 respectively for examples 15 to 20.

[Evaluation]

The fuse function test was carried out for each solid electrolytic capacitor. FIG. 9 shows the evaluation results (performance index dependence) of the number of open circuits for each solid electrolytic capacitor. The solder reflow process described above was used employed to perform soldering on the printed substrate, and the fuse function test was carried out in a manner similar to FIG. 6. The table of FIG. 9 shows the evaluation results of the performance index in each of example 2 (solid electrolytic capacitor A2), examples 6 to 9 (solid electrolytic capacitors B1 to B4), and examples 10 to 13 (solid electrolytic capacitors C1 to C4) in which the content of the thermally expandable graphite grains 4 (thermal initiation temperature of 300° C.) was 40% by weight or less.

As shown in FIG. 9, the current can be broken during a short-circuit when the performance index (product of expansion coefficient and content) of the thermally expandable graphite grains 4 is greater. In particular, when the performance index is 100 or greater, the number of open circuits is 100, and the fuse function for breaking the current when an overcurrent flows is more ensured.

Therefore, it is preferred that the performance index of the thermally expandable graphite grains 4 in the conductive polymer layer 3 be 100 or greater.

The solid electrolytic capacitor of the preferred embodiment has the following advantages.

(1) The fuse function for breaking current when overcurrent flows to the capacitor element 10 is implemented in the solid electrolytic capacitor by containing the thermally expandable graphite grains 4 in the conductive polymer layer 3.

(2) The thermally expandable graphite grains 4 are contained in the conductive polymer layer 3. Thus, advantage (1) is a benefit with the solid electrolytic capacitor having substantially the same size as a solid electrolytic capacitor that does not have the fuse of the related art, that is, without enlarging the solid electrolytic capacitor.

(3) A solid electrolytic capacitor may implement the fuse function by simply containing the thermally expandable graphite grains 4 in the conductive polymer layer 3. This enables the solid electrolytic capacitor to be more compact than the conventional fuse-incorporated solid electrolytic capacitor.

(4) The thermally expandable graphite grains 4 are distributed substantially throughout the conductive polymer layer 3, which is formed on the dielectric layer 2. Thus, thermal load produces an electrical gap substantially throughout the conductive polymer layer 3. This ensures breakage of the current flowing to the capacitor element 10. Accordingly, the fuse function described in advantages (1) to (3) works in a further ensured manner.

(5) When containing the thermally expandable graphite grains 4 in the conductive polymer layer 3, it is preferred that the thermal initiation temperature of the thermally expandable graphite be in the range of 300° C. to 400° C. This ensures that current is broken during a short-circuit. Accordingly, the fuse function described in advantages (1) to (4) works in a further ensured manner.

(6) When containing the thermally expandable graphite grains 4 in the conductive polymer layer 3, it is preferred that thermally expandable graphite has an expansion coefficient of 2.5 cm$^3$/g or greater. This ensures that current is broken during a short-circuit. Accordingly, the fuse function described in advantages (1) to (5) works in a more ensured manner.

(7) It is preferred that content of the thermally expandable graphite grains 4 in the conductive polymer layer 3 be in the range of 5% by weight to 40% by weight. This ensures that current is broken during a short-circuit. Accordingly, the fuse function described in advantages (1) to (6) works in a more ensured manner.

(8) When containing the thermally expandable graphite grains 4 in the conductive polymer layer 3, it is preferred that the performance index (product of expansion coefficient ($cm^3/g$) and content (% by weight)) of the thermally expandable graphite grains 4 be 100 or greater. This ensures that current is broken during a short-circuit. Accordingly, the fuse function described in advantages (1) to (7) works in a more ensured manner.

(9) A solid electrolytic capacitor may implement the fuse function by simply containing the thermally expandable graphite grains 4 in the conductive polymer layer 3. Thus, in comparison with the conventional fuse-incorporated solid electrolytic capacitor, the cost of the solid electrolytic capacitor can be lowered.

[Mounting Substrate]

The mounting substrate of the present invention is fabricated by mounting the solid electrolytic capacitor of each example thereon using a solder member. Specifically, the mounting substrate includes a mounting surface and two external electrodes, which are used to mount the solid electrolytic capacitor on the mounting surface. The anode terminal 6 of the solid electrolytic capacitor is connected to one of the external electrodes by a solder member, and the cathode terminal 7 of the solid electrolytic capacitor is connected to the other external electrode by a solder member. A typical Pb-free solder material is used as the solder member. When connecting the two terminals (anode terminal 6, cathode terminal 7) with the solder member, a solder reflow process (soldering temperature of approximately 260° C.) is performed.

The solder member serves as the "solder member" of the present invention. The mounting substrate serves as the "circuit substrate" of the present invention.

The mounting substrate which uses solder members to mount the solid electrolytic capacitor of the present invention thereon has the following advantages in addition to advantages (1) to (9).

(10) The fuse function functions and breakage of the current flowing to the capacitor element 10 is ensured even if the solid electrolytic capacitor (capacitor element 10) is heated due to an abnormality in the mounting substrate and becomes short-circuited.

(11) When containing the thermally expandable graphite grains 4 in the conductive polymer layer 3 of the solid electrolytic capacitor, it is preferred that the thermally expandable graphite grains 4 having a thermal initiation temperature that is higher than the temperature (soldering temperature) at which the solder member melts during the reflow process be used. In this case, the solder member melts without expanding the thermally expandable graphite grains 4. That is, when connecting the solid electrolytic capacitor to the mounting substrate with solder members during the solder reflow process, an electrical gap produced in the conductive polymer layer 3 prevents the solid electrolytic capacitor (capacitor element 10) from being damaged. This improves the manufacturing yield of the mounting substrate.

(12) Even if the solid electrolytic capacitor (capacitor element 10) is heated due to an abnormality in the mounting substrate and thereby becomes short-circuited, the fuse function works. Thus, the solid electrolytic capacitor is prevented from applying thermal load (thermal damage) to other components (e.g., IC chip) on the mounting substrate.

Figure 4:
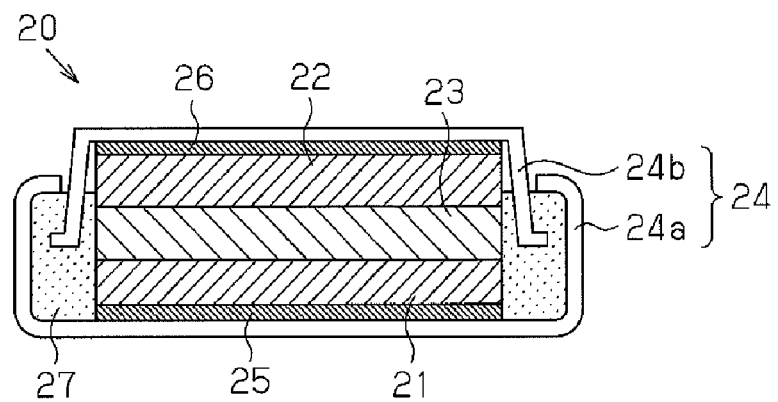
FIG. 4 is a schematic diagram showing the structure of a rechargeable battery in the preferred embodiment.

A rechargeable battery serving as one example of an electronic component according to the present invention will now be discussed. FIG. 4 shows an example of a rechargeable battery.

FIG. 4 is a cross-sectional view showing the structure of a battery, which is a rechargeable battery 20. The battery 20*b* includes a positive electrode layer 21 and a negative electrode layer 22. An electrolyte layer 23, which is formed from polymers containing pre-expansion thermally expandable graphite (not shown), is arranged between the positive electrode layer 21 and negative electrode layer 22. The positive electrode layer 21, the electrolyte layer 23, and the negative electrode layer 22 are laminated together and accommodated in a battery case 24. Specifically, the battery case 24 includes a positive electrode container 24*a* and a negative electrode container 24*b*, which are fitted together. The positive electrode container 24*a* is can-shaped and has an open top. The negative electrode container 24*b* is can-shaped and has an open bottom. The positive electrode layer 21 is connected to the positive electrode container 24*a* by way of a positive electrode current collector layer 25. The negative electrode layer 22 is connected to the negative electrode container 24*b* by way of a negative electrode current collector layer 26. An annular insulation packing 27 connects the positive electrode container 24*a* and the negative electrode container 24*b* in an electrically insulated state. The thermally expandable graphite contained in the polymer electrolyte layer 23 of the rechargeable battery 20 may be the thermally expandable graphite grains 4 that are contained in the conductive polymer layer 3 of the capacitor element 10 for the solid electrolytic capacitor of above-described example 1.

In the rechargeable battery 20 of FIG. 4, the thermally expandable graphite grains 4 in the polymer electrolyte layer 23 expands when, for example, overcharging results in the flow of abnormal current and heats the rechargeable battery 20 to a high temperature. This forms a large void in the electrolyte layer 23. The void produces an electrical gap and has an insulation effect. This breaks the current flowing to the rechargeable battery 20 and prevents abnormal heating.

The thermally expandable graphite grains 4 are contained in the electrolyte layer 23 of the rechargeable battery 20. Thus, the fuse function is implemented in a rechargeable battery having substantially the same size as a rechargeable battery that does not have the fuse of the related art, that is, without enlarging the rechargeable battery.

Furthermore, the thermally expandable graphite grains 4 are distributed substantially throughout the electrolyte layer 23. Thus, thermal load produces an electrical gap substantially throughout the electrolyte layer 23 and ensure that the flow of current to the rechargeable battery 20 is broken.

It is preferred that the thermal initiation temperature of the thermally expandable graphite grains 4 contained in the electrolyte layer 23 be in the range of 300° C. to 400° C. The expansion coefficient of the thermally expandable graphite grains 4 is preferably 2.5 $cm^3/g$ or greater. Furthermore, the content of the thermally expandable graphite grains 4 in the electrolyte layer 23 is preferably in the range of 5% by weight to 40% by weight. It is further preferred that the performance index (product of expansion coefficient ($cm^3/g$) and content (% by weight)) of the thermally expandable graphite grains 4 be 100 or greater.

Thermally expandable graphite grains 4 satisfying these conditions are selected and contained in the electrolyte layer 23. This ensures that current is broken when a short-circuit generates excessive heat.

Therefore, the rechargeable battery 20 may implement the fuse function by simply changing the conventional polymer electrolyte layer to the electrolyte layer 23, which contains the thermally expandable graphite grains 4. Thus, in comparison with when incorporating a fuse of the related art in the rechargeable battery, the cost for manufacturing the rechargeable battery can be lowered.

A semiconductor circuit device serving as another example of an electronic component according to the present invention will now be discussed. FIG. 5 shows an example of the semiconductor circuit device.

Figure 5A:
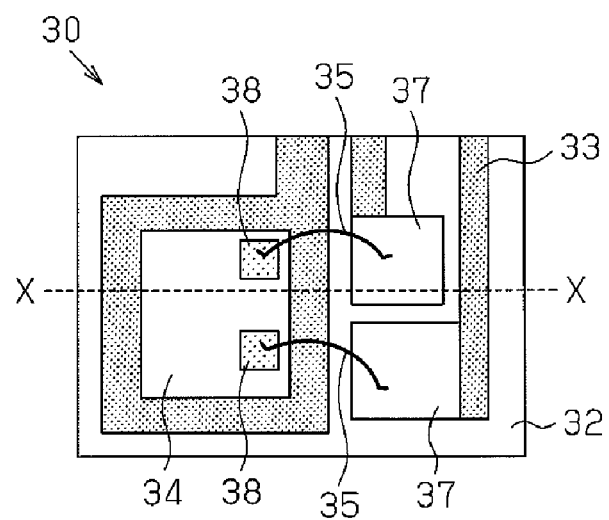
FIG. 5A is a schematic plan view showing a semiconductor circuit device in the preferred embodiment.
Figure 5B:
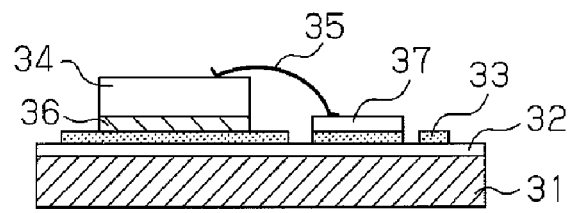
FIG. 5B is a schematic cross-sectional view of the semiconductor circuit device shown in FIG. 5A.

FIG. 5A is a plan view showing the structure of a semiconductor circuit device 30 (integrated circuit device), and FIG. 5B is a cross-sectional view taken along broke line X-X in FIG. 5A. The semiconductor circuit device 30 is a module including a metal substrate 31, a circuit substrate arranged on the substrate 31 by way of an insulative film 32 and including a conductive path 33, and a semiconductor circuit chip 34 attached to the circuit substrate. In the semiconductor circuit device 30, a conductive adhesive layer 36, which is formed by a conductive polymer containing pre-expansion thermally expandable graphite (not shown), mechanically adheres and electrically connects the conductive path 33 to a ground terminal located on the lower surface of the semiconductor circuit chip 34. Two signal terminals 38 are arranged on the upper surface of the semiconductor circuit chip 34. Connection terminals 37 are arranged on the substrate 31. Metal wires 35 wire-bond and connect the signal terminals 38 and connection terminals 37, respectively. The thermally expandable graphite contained in the conductive adhesive layer 36 of the semiconductor circuit device 30 may be the same as the thermally expandable graphite grains 4 contained in the conductive polymer layer 3 of the capacitor element 10 for the solid electrolytic capacitor of above-described example 1.

In the semiconductor circuit device 30 of FIG. 5, the thermally expandable graphite grains 4 in the conductive adhesive layer 36 expands when, for example, overcurrent or a short-circuit results in the flow of abnormal current and heats the semiconductor circuit device 30 to a high temperature. This forms a large void in the conductive adhesive layer 36. The void produces an electrical gap and has an insulation effect. This breaks the current flowing to the semiconductor circuit chip 34 and prevents abnormal heating.

The thermally expandable graphite grains 4 are contained in the conductive adhesive layer 36 of the semiconductor circuit device 30. Thus, the fuse function is implemented in a semiconductor circuit device having substantially the same size as a semiconductor circuit device that does not have the fuse of the related art, that is, without enlarging the semiconductor circuit device 30.

Furthermore, the thermally expandable graphite grains 4 are distributed substantially throughout the conductive adhesive layer 36. Thus, thermal load produces an electrical gap substantially throughout the conductive adhesive layer 36 and ensures that the flow of current to the semiconductor circuit chip 34 in the semiconductor circuit device 30 is broken.

It is preferred that the thermal initiation temperature of the thermally expandable graphite grains 4 contained in the conductive adhesive layer 36 be in the range of 300° C. to 400° C. Further, it is preferred that the expansion coefficient of the thermally expandable graphite grains 4 be 2.5 cm³/g or greater. Additionally, it is preferred that the content of the thermally expandable graphite grains 4 in the polymer electrolyte layer 23 be in the range of 5% by weight to 40% by weight. Moreover, it is preferred that the performance index (product of expansion coefficient (cm³/g) and content (% by weight)) of the thermally expandable graphite grains 4 be 100 or greater. Thermally expandable graphite grains 4 satisfy these conditions are selected and contained in the conductive adhesive layer 36. This ensures that current is broken when a short-circuit generates excessive heat.

Therefore, the semiconductor circuit device 30 may implement the fuse function by simply changing the conventional conductive adhesive layer to the conductive adhesive layer 36, which contains the thermally expandable graphite grains 4. Thus, in comparison with when incorporating a fuse of the related art in the semiconductor circuit device, the cost for manufacturing the semiconductor circuit device 30 can be lowered.

It should be apparent to those skilled in the art that the present invention may be embodied in many other specific forms without departing from the spirit or scope of the invention. Particularly, it should be understood that the present invention may be embodied in the following forms.

The present invention is not limited to electronic components, such as the solid electrolytic capacitor, the rechargeable battery, and the semiconductor circuit device described above, and may be applied to other electronic components.

In the above-described solid electrolytic capacitor, an anode foil formed from a valve metal may be used in lieu of the anode body, which is a porous sinter formed from a valve metal.

In the above-described solid electrolytic capacitor, the conductive polymer layer containing the thermally expandable graphite may be formed through electrolytic polymerization and the like instead of chemical polymerization. Alternatively, chemical polymerization and electrolytic polymerization may be combined.

In each embodiment described above, the conductive polymer layer containing the thermally expandable graphite may be a laminated structure including a plurality of conductive polymer layers instead of a single-layer structure including a single conductive polymer layer. In this case, the thermally expandable graphite may be contained in at least one of the conductive polymer layers of the laminated structure. If the conductive polymer layer has a laminated structure, each layer may be formed from the same material or from different materials.

In each embodiment described above, flakes of thermally expandable graphite powder may be used in lieu of the grains of thermally expandable graphite powder. Alternatively, a mixed powder of grains and flakes may be used.

The present examples and embodiments are to be considered as illustrative and not restrictive, and the invention is not to be limited to the details given herein, but may be modified within the scope and equivalence of the appended claims.

What is claimed is:

1. A solid electrolytic capacitor comprising:
    an anode body;
    a dielectric layer formed on the anode body;
    a conductive polymer layer formed on the dielectric layer; and
    a cathode layer formed on the conductive polymer layer;
    wherein the conductive polymer layer contains thermally expandable graphite in which layers of graphite crystals are formed, and
    wherein the thermally expandable graphite forms a void between the layers of graphite crystals by a thermal load occurred when an overcurrent flows so as to produce an electrical gap in the conductive polymer layer to break current flowing between the anode body and the cathode layer.

2. The solid electrolytic capacitor according to claim 1, wherein the thermally expandable graphite is distributed substantially throughout the conductive polymer layer.

3. The solid electrolytic capacitor according to claim 1, wherein the conductive polymer layer contains the thermally expandable graphite in a pre-expansion state.

4. The solid electrolytic capacitor according to claim 3, wherein the thermally expandable graphite includes layers of a plurality of crystalline planes of the graphite, with each crystalline plane being expanded by a thermal load in a direction in which the layers are laminated and thereby forming a void between the crystalline planes of the graphite.

5. The solid electrolytic capacitor according to claim 1, wherein the thermally expandable graphite starts to expand at a temperature in a range of 300° C. to 400° C.

6. The solid electrolytic capacitor according to claim 1, wherein the thermally expandable graphite expands in an environment of 300° C. to break current flowing between the anode body and the cathode layer.

7. The solid electrolytic capacitor according to claim 1, wherein the thermally expandable graphite is contained in the conductive polymer layer so that content of the thermally expandable graphite in the conductive polymer layer multiplied by an expansion coefficient of the thermally expandable graphite is 100 or greater.

8. The solid electrolytic capacitor according to claim 1, wherein the thermally expandable graphite has an expansion coefficient of 2.5 cm$^3$/g or greater.

9. The solid electrolytic capacitor according to claim 1, wherein the thermally expandable graphite is contained in the conductive polymer layer at a content in a range of 5% by weight to 40% by weight.

10. The solid electrolytic capacitor according to claim 1, wherein the thermally expandable graphite forms a void in the conductive polymer layer that changes in accordance with at least one of an expansion coefficient, expansion initiation temperature, or content of the thermally expandable graphite in the conductive polymer layer.

11. A circuit substrate comprising:
a solid electrolytic capacitor connected to the circuit substrate with a solder member, the solid electrolytic capacitor including:
an anode body;
a dielectric layer formed on the anode body;
a conductive polymer layer formed on the dielectric layer; and
a cathode layer formed on the conductive polymer layer;
wherein the conductive polymer layer contains thermally expandable graphite in which layers of graphite crystals are formed, and the thermally expandable graphite starts to expand at a temperature that is higher than the melting temperature of the solder member,
wherein the thermally expandable graphite forms a void between the layers of graphite crystals by a thermal load occurred when an overcurrent flows so as to produce an electrical gap in the conductive polymer layer to break current flowing between the anode body and the cathode layer.

12. An integrated circuit device comprising:
an electronic component including a ground terminal and a signal terminal, in which the around terminal is attached to a circuit substrate by a conductive adhesive layer,
wherein the conductive adhesive layer contains thermally expandable graphite in which layers of graphite crystals are formed, and
wherein the thermally expandable graphite forms a void between the layers of graphite crystals by a thermal load occurred when an overcurrent flows so as to produce an electrical gap in the conductive adhesive layer to break current flowing between the ground terminal and the signal terminal.

13. The integrated circuit device according to claim 12, wherein the conductive adhesive layer contains the thermally expandable graphite in a pre-expansion state.

14. The integrated circuit device according to claim 13, wherein the thermally expandable graphite includes layers of a plurality of crystalline planes of the graphite, with each crystalline plane being expanded by a thermal load in a direction in which the layers are laminated and thereby forming a void between the crystalline planes of the graphite.

15. A battery, comprising:
a positive electrode layer;
a negative electrode layer; and
an electrolyte layer containing thermally expandable graphite and arranged between the positive electrode layer and the negative electrode layer, wherein layers of graphite crystals are formed in the thermally expandable graphite, and
wherein the thermally expandable graphite forms a void between the layers of graphite crystals by a thermal load occurred when an overcurrent flows so as to produce an electrical gap in the electrolyte layer to break current flowing between the positive electrode layer and the negative electrode layer.

\* \* \* \* \*